June 25, 1963
J. R. ERICKSON ETAL
3,095,203
SEALS
Filed Nov. 15, 1960
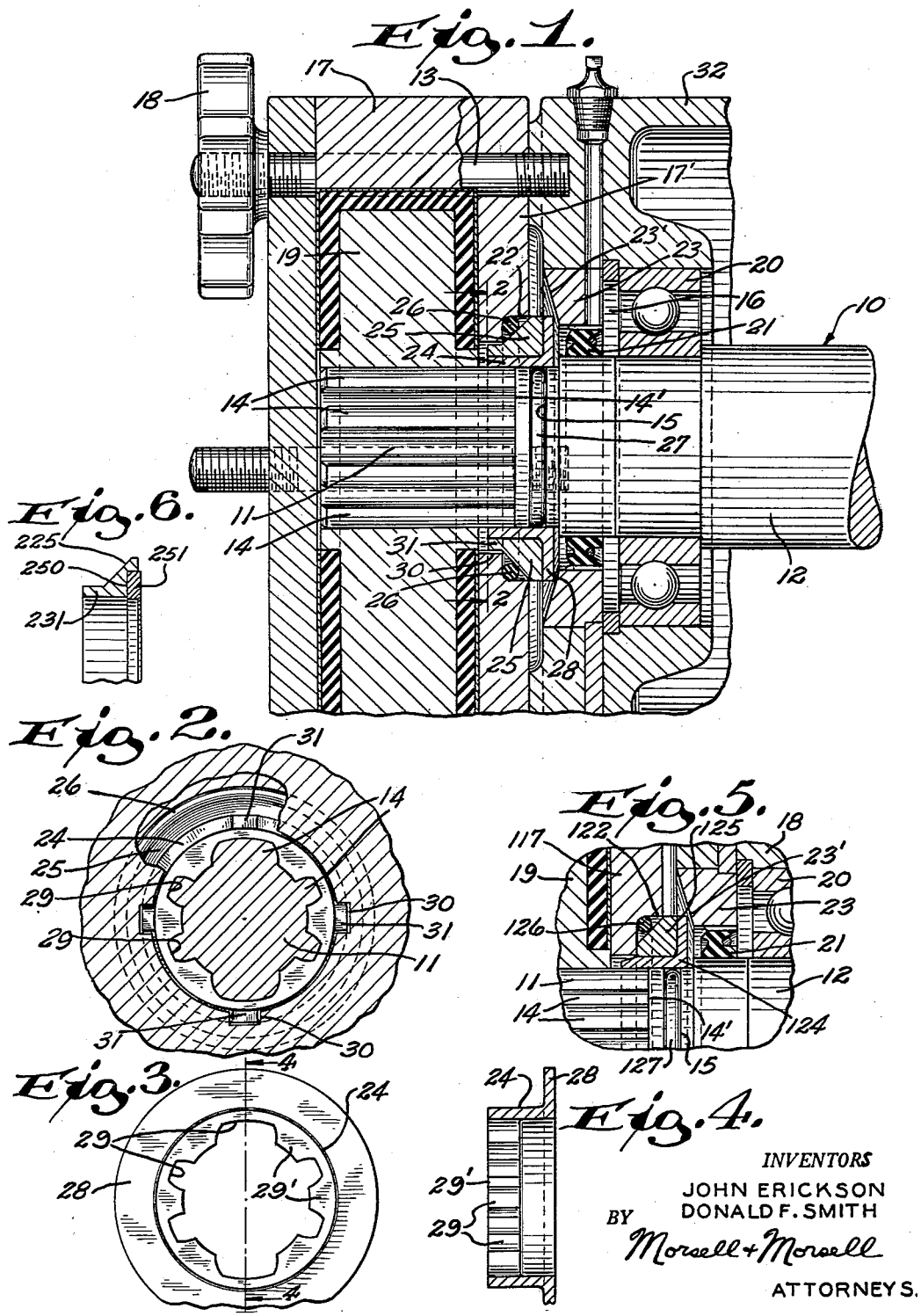
INVENTORS
JOHN ERICKSON
DONALD F. SMITH
BY Morsell + Morsell
ATTORNEYS 3,095,203
SEALS
John R. Erickson, South Milwaukee, and Donald F. Smith, Kenosha, Wis., assignors to Ladish Co., Cudahy, Wis., a corporation of Wisconsin
Filed Nov. 15, 1960, Ser. No. 69,374
9 Claims. (Cl. 277—82)

This invention relates to improvements in seals, and more particularly to an improved seal for relatively rotatable elements.

The general object of the present invention is to provide a novel seal for relatively rotatable elements such as the rotary impeller shaft and the stationary casing in a liquid food pump or similar device, which seal is not only designed to effectively prevent leakage betwen said members, but which seal can be quickly and easily disassembled when it is desired to clean the pump.

A further object of the invention is to provide an improved rotary seal for liquid food or chemical pumps or the like wherein power loss or drag caused by frictional resistance to the relative movement of the seal components is minimized, thereby not only minimizing wear, but reducing the power requirements of the pump.

Still further objects of the present invention are to provide an improved seal which is relatively simple and inexpensive in construction, reliable in operation, and otherwise well adapted for its intended purposes.

With the above and other objects in view, which other objects will hereinafter appear, the invention consists of the improved seal, and all of its parts and combinations, as set forth in the claims, and all equivalents thereof.

In the accompanying drawing, illustrating several forms of the invention, wherein the same reference characters designate the same parts in all of the views:

FIG. 1 is a fragmentary sectional view of a liquid food pump or similar device, showing a rotary impeller shaft having the improved seal mounted thereon;

FIG. 2 is a fragmentary vertical sectional view through the shaft and bearing assemblage, taken along line 2—2 of FIG. 1;

FIG. 3 is an end elevational view of the splined wear ring alone;

FIG. 4 is a vertical sectional view through the wear ring, taken along line 4—4 of FIG. 3;

FIG. 5 is a fragmentary view of a pump shaft and bearing assemblage, and showing a modification of the principal form of the invention; and FIG. 6 is a fragmentary sectional view showing a modified form of seal ring.

Referring now more particularly to the drawing, the numeral 10 designates a rotary impeller shaft of the general type employed in liquid food pumps and similar equipment, said shaft including an outer portion 11 of one diameter and an inner portion 12 having a greater diameter. The pump may be constructed as shown in the copending Wegener and Lehman application, Serial No. 33,421 filed June 2, 1960, now abandoned. The outer shaft portion 11 is provided with splines 14 which terminate short at 14' where there are stop shoulders at the ends of the grooves between splines. An annular groove 15 is formed in said shaft between the ends of said splines and the enlarged portion of the shaft. The illustrated pump assemblage also includes a casing 17 having a pump chamber within which an impeller 19 is carried, and includes a bearing housing 32, having a plurality of studs 13 projecting therefrom through bores in the pump casing and there being nuts 18 for detachably clamping the pump casing to the bearing housing 32. There also are alined bores through which the rotary shaft 10 projects. A conventional ball bearing assembly 20 and bearing retainer ring 16, and a resilient sealing ring 21 are also shown.

The inner face 17' of the impeller casing 17 in the present invention is provided with a counterbore 22 (FIG. 1) surrounding the rotary shaft, and the abutting face of an internal ring 23 in the bearing housing 32 has an annular taper 23 forming a cavity into which the improved sealing device projects.

As best appears in FIG. 2, in the principal form of the invention the margin of the bore of the wall 17' of the impeller casing 17 is provided with recesses 30 which are spaced circumferentially around the shaft 10 and which extend axially thereof, said slots forming an important element of the principal form of the invention, as will be seen.

*Principal Seal Construction*

The improved sealing unit, which is designed to minimize the escape of liquid from the pump chamber along the rotary shaft and into the bearing housing includes a first O ring 27, formed of rubber or similar material, which ring surrounds the impeller shaft 10 and is snugly fitted within the aforementioned annular groove 15. Said resilient O ring 27 pressurably engages the inner surface of a wear ring 24 which is removably mounted on said shaft in overlapping relation to said O ring.

The wear ring 24 is formed of stainless steel or similar corrosion and wear resistant material and has a cylindrical portion surrounding the shaft 10 and an annular flange 28. As illustrated in FIGS. 3 and 4, the wear ring is provided with axial splineways 29 adapted to receive the splines 14 on the impeller shaft to removably and drivingly engage said ring thereon. The splines 29' of the ring extend approximately half the length of the wear ring and have the ends abutting the shoulders 14'. The inner end of said ring bore is smooth and is designed to fit closely around the shaft with the resilient O ring 27 pressurably bearing thereagainst and providing a liquid-tight seal between the shaft and wear ring.

Referring again to FIG. 1 of the drawing, positioned adjacent the wear ring 24 is a stationary seal ring 25 which is preferably formed of a low friction material such as carbon or Teflon in order to minimize frictional drag and wear. Said seal ring is generally triangular in cross section, having perpendicular faces abutting both the cylindrical and flange portions of said metal wear ring 24, and the third face of said seal ring is biased to provide an O ring space between said seal ring and the corner of the casing counterbore 22.

In the principal form of the invention said seal ring 25 is provided with spaced tangs 31 which project axially of the shaft 10 and which are removably received in the aforementioned casing slots 30 to lock said seal ring against rotation. Consequently, when the wear ring 24 rotates with the shaft 10 said seal ring 25 remains stationary, thereby eliminating any frictional engagement between the same and the casing 17.

By forming the seal ring 25 of a material such as carbon or Teflon, having a low coefficient of friction and a characteristic surface slipperiness, there is relatively little friction developed between said stationary seal ring and the rotating metal ring 24, and wear on said members is minimized. Moreover, the slipperiness and low friction characteristics of said seal ring minimize the drag between said relatively movable members and reduce the power requirements of the pump. While said seal ring is ordinarily formed entirely of carbon or similar material, as described, it might be preferred in some instances to form the body of said ring of stainless steel or other more durable material, and to press fit or bond a layer of low friction material on the sealing faces thereof, thereby obtaining the advantages of both types of material, and the design of said seal ring is not to be limited in this respect.

With particular reference again to FIG. 1, a second rubber O ring 26 is wedged within the aforementioned space between the triangularly-shaped seal ring 25 and the inner corner of the casing counterbore 22, in somewhat compressed condition, to form a liquid-tight seal between the ring members and the casing. In addition, when the pump casing 17 is fastened securely to the casing 32 by the nuts 18, said O ring 26 bears against the tapered face of the seal ring 25 and urges the sealing faces of the latter ring into sealing engagement with both the cylindrical surface and the radial flange portion of the wear ring 24, said wear ring being maintained against inward axial movement by the engagement of the ends of its splines 29' with the shaft shoulders 14' at the end of the spline grooves of the shaft. Said second O ring 26 thereby not only provides a compression seal between the ring unit and the casing, but by constantly urging the seal ring 25 into tight engagement with the rotating ring 24, the resilient ring provides for continuous automatic adjustment of said seal ring to compensate for wear, and ensures that said rings 24 and 25 are always in tight contact with each other.

As will be readily understood, while the O rings 26 and 27 have been hereinabove described as being formed of rubber, said rings may be made of any similar resilient material, including synthetics. Likewise, while the term O ring has been used, it is not intended to limit the same to a ring having a circular cross section, since rings having other cross sectional forms might also function satisfactorily.

In accordance with the present invention, as hereinabove described, the complete seal assemblage includes a resilient O ring 27, which removably surrounds the impeller shaft within the annular groove 15; a splined wear ring 24 positively removably mounted on said rotary impeller shaft and axially limited in its movement; a stationary seal ring 25, having seal faces formed of a low friction material, sealingly engaging said wear ring, the tangs 31 on said seal ring fitting within slots 30 provided therefor in the pump casing and locking said ring against rotation; and a second resilient O ring 26 surrounding and bearing against said seal ring to maintain the same in sealing contact with the wear ring 24 and, additionally, forming a seal between said interfitting ring members and the pump casing. The result is a novel seal for relatively fixed and rotatable members which effectively minimizes leakage between said members, thereby avoiding loss of pressure as well as loss of the liquid product.

In addition to functioning as an unusually effective and efficient sealing device, the improved seal unit comprising the present invention is also distinguished by the fact that none of its individual ring members are permanently secured together, or to the pump, and the entire unit can be quickly and easily disassembled after the pump casing has been detached from the frame 32 and removed. This is especially important in food-handling equipment as it permits frequent thorough cleaning of the entire assemblage and eliminates the possibility of food particles becoming lodged between the rings and contaminating the liquid food product.

Modified Seal Construction

Referring now to FIG. 5 of the drawing, illustrated therein is a modified form of the present invention. In this form of the invention the construction of the seal is generally similar to that illustrated in FIGS. 1 through 4, including a first resilient ring 127, a splined wear ring 124, a seal ring 125, and a second resilient O ring 126, corresponding to the rings 27, 24, 25, and 26, respectively, in FIG. 1. Unlike the form of the invention hereinabove described, however, the seal ring 125 is devoid of the tangs 31 projecting from the seal ring 25 in FIG. 1 and the casing 117 is formed without the tang-receiving slots 30 characterizing the casing 17 in the principal form of the invention. This relatively simplified structure has been found to be suitable in devices wherein it is not essential that the seal ring be positively locked against rotation.

In the modification of FIG. 6, a substitute for the seal ring 25 of FIG. 1 is illustrated. This seal ring is substantially the same as the seal ring 25 except that the radial face thereof has a recess 250 receiving a ring 251 of carbon or composition material having properties similar to carbon. In the principal form of the invention as well as in the form of FIG. 5 the seal ring 25 or 125 is formed entirely of carbon or other low friction hard material such as filled "Teflon." In the modification of FIG. 6, however, the main portion of the seal 225 may be formed of a less expensive material such as stainless steel or other composition material with only the insert 251 formed of carbon or equivalent low friction hard material. The ring 251 may be press-fitted into the recess 250 or it may be bonded in position. In FIG. 6 the modification is shown as constructed with tangs 231 as in the form of the invention of FIG. 1. The tang of FIG. 6 may, however, be omitted for use in an arrangement like FIG. 5.

Summary

From the foregoing detailed description, it will be seen that both the principal and modified forms of the present invention provide a novel seal which has many advantages over conventional rotary seals. Not only is the present device adapted to minimize leakage between the relatively rotatable members in a liquid food pump or the like, but said seal does not effect the operation or increase the power requirements of the pump. In addition, the device is self-adjusting to compensate for wear, and, most important, the seal is so constructed that it can be easily disassembled for cleaning.

It is to be understood, of course, that the details of design and construction, including the materials employed, may be modified to suit particular machine requirements and the invention is not to be limited to the exact structure hereinabove described. Moreover, while the improved seal has been described herein as being particularly well suited for use in liquid food pumps, because of the separability of its components, the device may also be advantageously employed in numerous other types of machines without departing from the spirit of the invention. All of such changes, both in the construction and use of the device, are contemplated as may come within the scope of the following claims.

What we claim is:

1. In a device having a casing and having a splined rotary shaft journalled in said casing, said casing having a bore surrounding a portion of said shaft, a first resilient ring surrounding said shaft; a driven ring having a bore portion removably splined to said shaft and having a bore portion in overlapping relation to said first resilient ring when in assembled position and having an annular sealing flange, there being stop means preventing axial movement of said driven ring when said driven ring is in said assembled position; a seal ring surrounding said driven ring and having a portion abutting said annular flange; cooperating means on said seal ring and casing removably locking the seal ring against rotation; and a second resilient ring surrounding said seal ring and compressed between said seal ring and said casing and positioned to continuously urge said seal ring axially into engagement with said annular flange of the driven ring and also acting as an external seal between the seal ring and casing.

2. In a device having a stationary casing with a shaft bore, and having a rotary shaft journalled in said casing bore, said shaft having a splined portion and having stop means at the end of said splined portion, said shaft having an annular groove therein beyond said stop means and said casing having counterbore communication with said shaft bore and surrounding the grooved portion of said shaft, there being circumferentially spaced recesses in the casing bore, a first resilient ring fitted within said annular groove of the shaft, a rigid driven ring surrounding said shaft and having a smooth bore portion in overlapping and compressing relation to said first resilient ring, said smooth bore portion of said rigid driven ring having an outwardly projecting annular flange thereon and the bore of said driven ring having a portion with axial splines interfitting with said splined portion of the shaft to removably drivingly engage said ring with said shaft, said splines having ends which engage the stop means of the shaft; a seal ring positioned on and abutting said driven ring, said seal ring being triangular in cross section and having a seal face engaging the annular flange of said rigid ring, and said seal ring having a tapered face which is tapered to provide a space between said ring and the casing, and said seal ring having tangs projecting axially therefrom and removably inserted in the recesses in said stationary casing bore; and a second resilient ring surrounding said seal ring and compressed between the tapered face of said seal ring and said casing and continuously urging said seal face of the seal ring against the annular flange of said rigid ring while providing an external seal between said seal ring and casing.

3. In a device having a casing and having a rotary shaft journalled in said casing, the latter having a counterbore surrounding said shaft, a rigid driven ring which is L-shaped in cross section removably mounted on said shaft for rotation therewith, a seal ring engaged in the L-shaped portion of said driven ring and having at least one right angularly related sealing face formed of relatively low friction material engaging said L-shaped portion, and said seal ring having an outer tapered face, and a resilient ring surrounding said seal ring and positioned within the casing counterbore and compressed between said counterbore and said tapered face of the seal ring and positioned to continuously urge said sealing face of the seal ring axially against said L-shaped portion of the driven ring while maintaining an external seal between said seal ring and casing.

4. In a device having a casing and having a rotary shaft journalled in said casing, the latter having a counterbore surrounding said shaft, a rigid driven ring which is L-shaped in cross section removably mounted on said shaft for rotation therewith, a seal ring engaged in the L-shaped portion of said driven ring and having right angularly related sealing faces engaging said L-shaped portion, one of said faces having a recess, an insert of low friction material in said recess, and said seal ring having an outer tapered face, and a resilient ring surrounding said seal ring and positioned within the casing counterbore and compressed between said counterbore and said tapered face of the seal ring and positioned to continuously urge said sealing face of the seal ring axially against said L-shaped portion of the driven ring while maintaining an external seal between said seal ring and casing.

5. In a device having a casing and having a splined rotary shaft journalled in said casing, said casing having a bore surrounding a portion of said shaft, a first sealing ring surrounding said shaft, a driven ring having a bore portion removably splined to said shaft and having a bore portion in overlapping relation to said first sealing ring when in assembled position and having an annular sealing flange, there being stop means preventing axial movement of said driven ring when said driven ring is in said assembled position, a seal ring surrounding said driven ring and having a portion abutting said annular flange, and a second resilient ring surrounding said seal ring and compressed between said seal ring and casing and positioned to continuously urge said seal ring axially into engagement with said annular flange of the driven ring while maintaining an external seal between said seal ring and casing.

6. In a device having a stationary casing with a shaft bore and having a shaft journalled in said bore for rotation, said shaft having an axial stop and having an annular groove beyond said stop, a sealing ring fitting within said annular groove, a rigid driven ring drivingly surrounding said shaft and having an annular flange and having a bore portion engaging said axial stop to locate the ring with a bore portion of the ring overlapping said sealing ring in the shaft; a seal ring fitting around said driven ring and having a sealing face engaging said annular flange of the rigid ring, said seal ring having a tapered face positioned to provide a space between said ring and the casing, and a resilient ring compressed between said tapered face and said casing and continually urging said sealing face of the seal ring axially against the annular flange of said rigid driven ring.

7. In a device having a stationary casing with a shaft bore and having a shaft journalled in said bore for rotation, said shaft having a splined portion with axial splines and having an adjacent unsplined portion forming stops at the end of said splined portion, said shaft having an annular groove around said unsplined portion adjacent said splines, a sealing ring fitting within said annular groove, a rigid driven ring surrounding said shaft and having an annular flange and having a bore portion with inwardly projecting splines of less length than the length of said driven ring and said bore having an unsplined portion, said splines engaging splines on the shaft with their ends engaging said stops on the shaft to axially locate the ring with said unsplined bore portion of the ring overlapping said sealing ring on the shaft; a seal ring fitting around said driven ring and having a sealing face engaging said annular flange of the rigid ring, said seal ring having a tapered face positioned to provide a space between said ring and the casing, and a resilient ring compressed between said tapered face and said casing and continually urging said sealing face of the seal ring against the annular flange of said rigid driven ring while maintaining an external seal between the seal ring and casing.

8. In a device having a stationary casing with a shaft bore and having a shaft journalled in said bore for rotation, said shaft having a splined portion with axial splines and having an adjacent unsplined portion forming stops at the end of said splined portion, said shaft having an annular groove around said unsplined portion adjacent said splines, a sealing ring fitting within said annular groove, a rigid driven ring surrounding said shaft and having an annular flange and having a bore portion with inwardly projecting splines of less length than the length of said driven ring and said bore having an unsplined portion, said splines engaging splines on the shaft with their ends engaging said stops on the shaft to axially locate the ring with said unsplined bore portion of the ring overlapping said sealing ring on the shaft; a seal ring fitting around said driven ring and having a sealing face engaging said annular flange of the rigid ring, said seal ring having a tapered face positioned to provide a space between said ring and the casing, a resilient ring compressed between said tapered face and said casing and continually urging said sealing face of the seal ring against the annular flange of said rigid driven ring while maintaining an external seal between the seal ring and casing, and cooperating means between said seal ring and casing for preventing rotation of the seal ring with the shaft.

9. In a device having a casing and having a shaft journalled in said casing for rotation, said shaft having a portion with a circumferential groove, a sealing ring in said circumferential groove, a rigid driven ring on said shaft and having an annular flange and having a smooth bore portion surrounding and overlapping said sealing ring when in assembled position, means drivingly connecting said rigid ring to the shaft for rotation therewith, cooperating stop means on said shaft and driven ring which are engageable in response to axial movement of the driven ring to said assembled position on said shaft, a seal ring surrounding said driven ring and having a sealing face positioned against said annular flange of the driven ring, and a resilient ring in said casing surrounding said seal ring and compressed between said seal ring and casing and positioned to urge the seal ring axially and maintain its seal face in engagement with the annular flange of the driven ring while maintaining an external seal between the seal ring and casing.

References Cited in the file of this patent

UNITED STATES PATENTS

| | | |
|---|---|---|
| 2,230,881 | Browne | Feb. 4, 1941 |
| 2,911,241 | Horvath et al. | Nov. 3, 1959 |